United States Patent [19]

Matthews et al.

[11] 4,451,977
[45] Jun. 5, 1984

[54] APPARATUS USEFUL IN REPAIR OF A TERMINATOR

[75] Inventors: James R. Matthews, Lower Sackville; Glen A. May, Victoria, both of Canada

[73] Assignee: Her Majesty the Queen in Right of Canada, as Represented by the Minister of National Defence, Ottawa, Canada

[21] Appl. No.: 378,322

[22] Filed: May 14, 1982

[30] Foreign Application Priority Data

Jun. 17, 1981 [CA] Canada ............................. 380014

[51] Int. Cl.³ ............................................. H01R 43/00
[52] U.S. Cl. ............................................. 29/748; 29/239; 29/256; 29/426.5; 29/461; 29/762; 29/764
[58] Field of Search ............. 29/764, 762, 748, 461, 29/426.5, 256, 263, 239

[56] References Cited

U.S. PATENT DOCUMENTS 3,146,522  9/1964  Wright ................................. 29/256
3,205,567  9/1965  Irvine et al. ..................... 29/764 X
3,903,588  9/1975  Alleva et al. ..................... 29/461
4,287,653  9/1981  Bloch ................................. 29/256
4,361,944  12/1982  Hamilton ......................... 29/256

Primary Examiner—Carl E. Hall
Attorney, Agent, or Firm—Murray & Whisenhunt

[57] ABSTRACT

Apparatus useful in repair of a termination of an outer cover of an armoured cable. The outer cover comprises a number of wires and the termination is effected by location of the wires between an inner body within the outer cover and an outer body outside the outer cover. The apparatus has a first block to surround the cable and grip the inner body. A second block surrounds the cable adjacent the first block. The second block abuts an end of the outer body. The two blocks can be forced apart to separate the inner and outer bodies and thus open the termination. A wire separator retains the wires of the outer cover separate after the forcing open of the termination. The apparatus is useful aboard ship whereas previously cables could only be reterminated in part.

11 Claims, 7 Drawing Figures

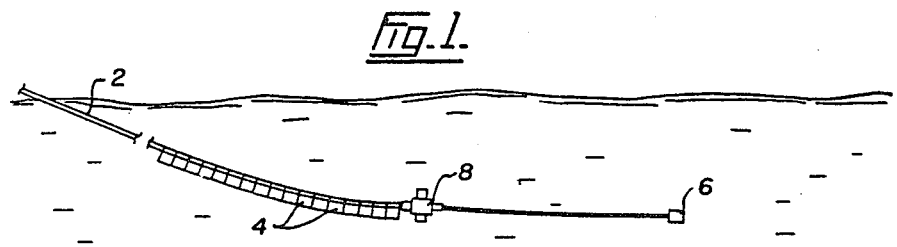
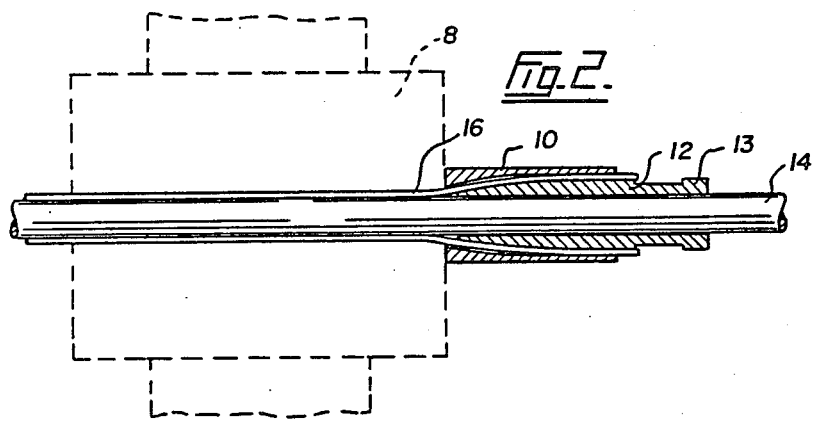
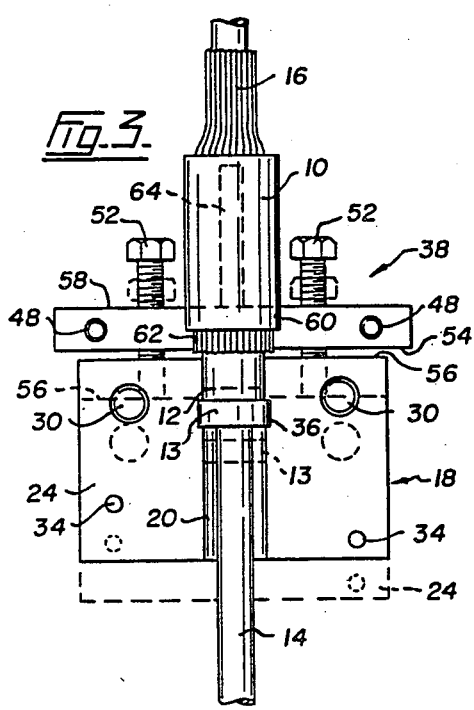

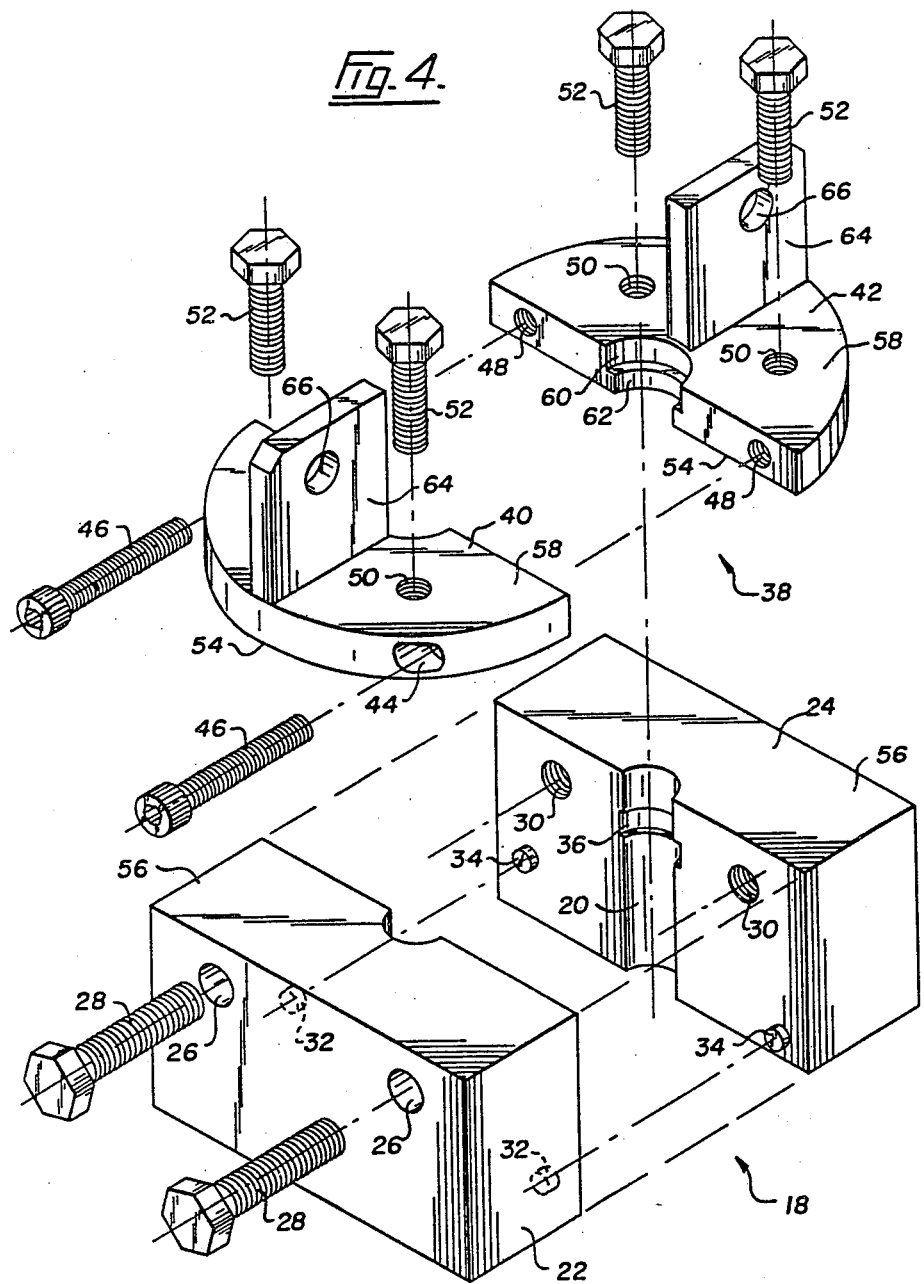

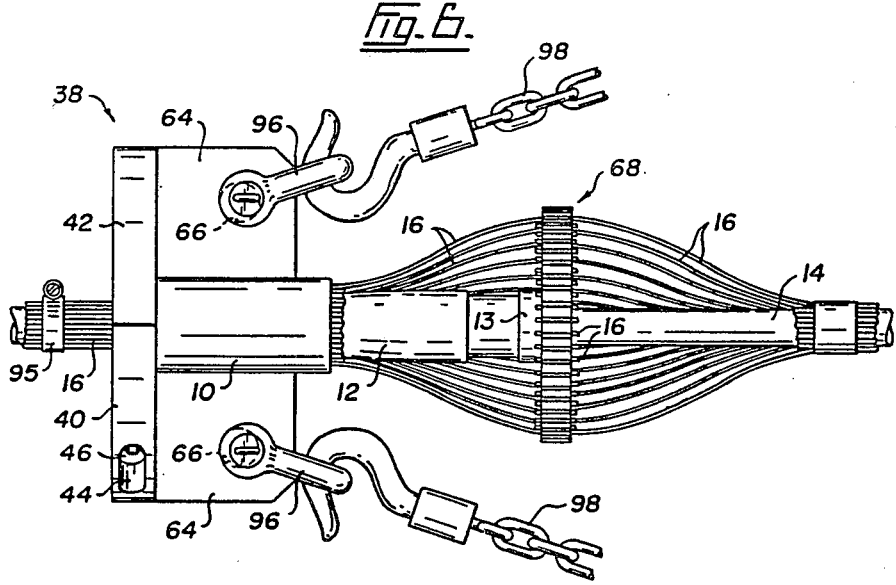
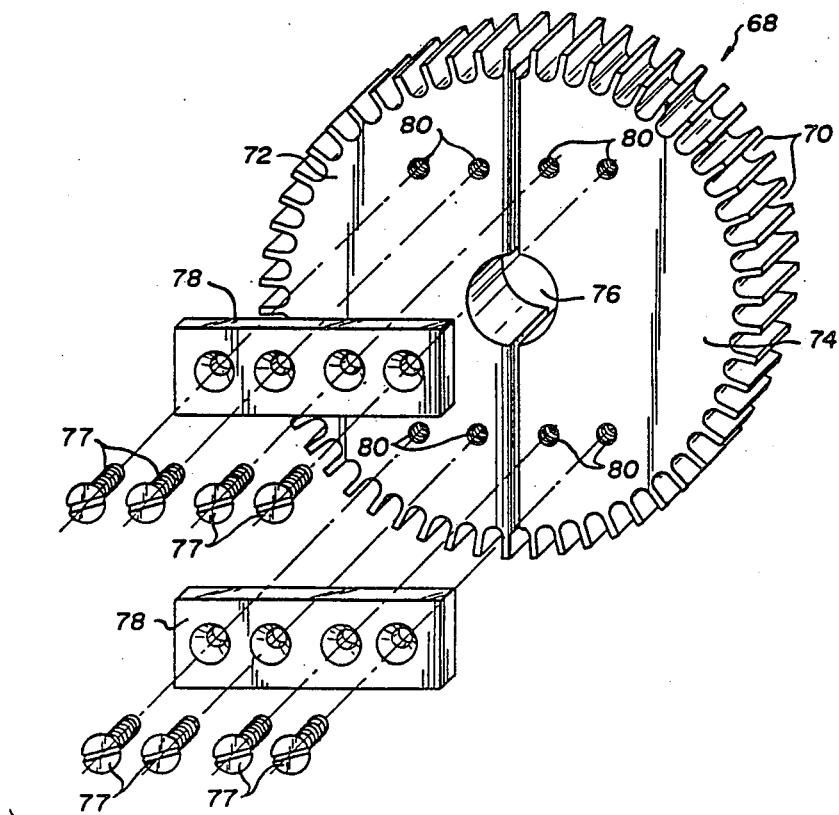

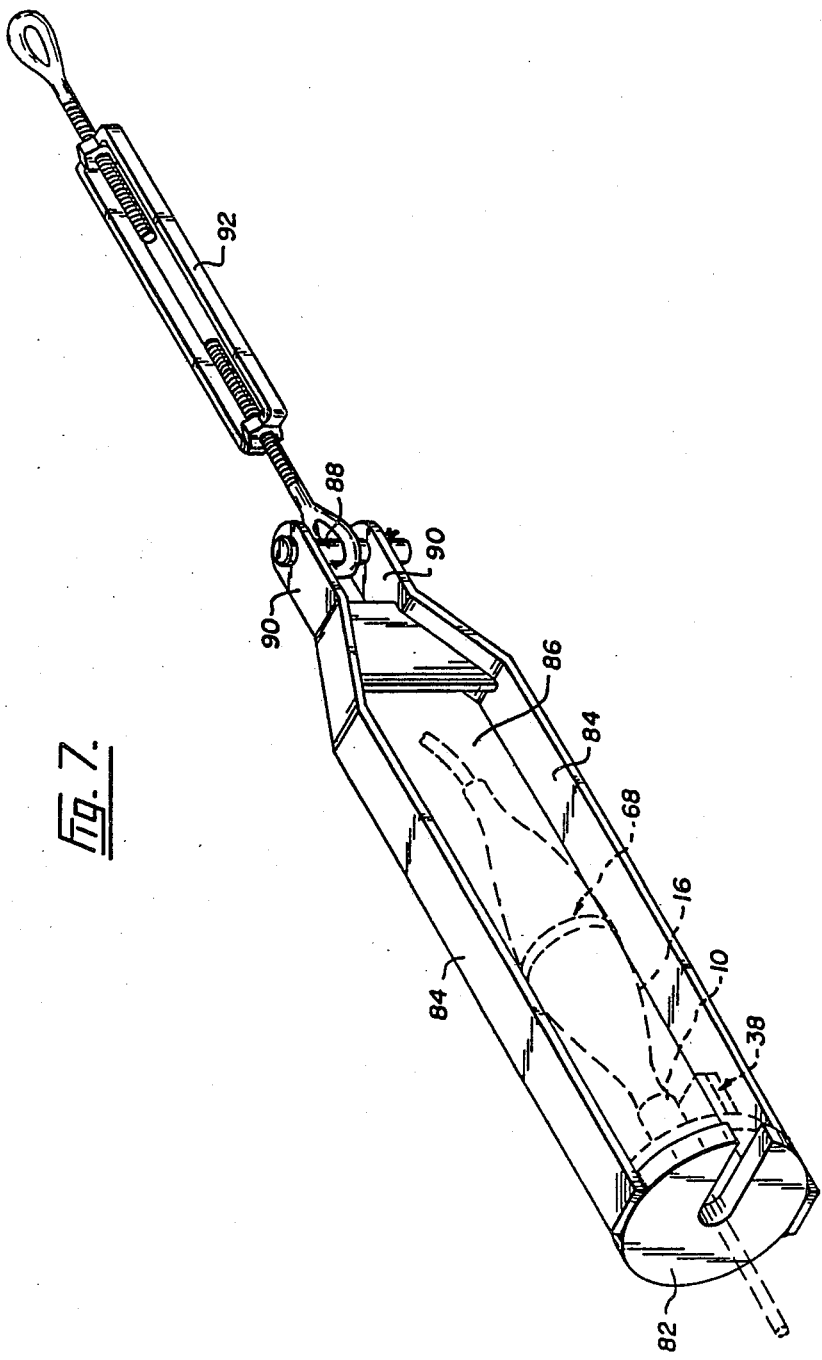

APPARATUS USEFUL IN REPAIR OF A TERMINATOR

This invention relates to an apparatus useful in repair of a termination of an outer cover of an armoured cable and an apparatus useful for both the termination and retermination of an armoured cable.

The invention finds particular application in reterminating the towing cable used with variable depth sonar equipment.

Sonar equipment is used to detect underwater objects. The equipment transmits a pulse of sound and receives a reflection from the underwater object. The sonar equipment is towed by a ship and operates at a considerable depth. Sonar equipment is principally used in the detection of submarines but it can also be used by trollers to detect fish and, indeed, for the detection of any underwater body. A signal is sent from the equipment along an electric cable to the towing ship.

In view of the length of the cable it is necessary that the cable be armoured. The electric cable alone could not stand the towing load. Accordingly, the tow cable characteristically comprises an electrical lead having an outer cover of an armoured cable. The armoured cover may typically comprise two layers of armour wire. The armour terminates between a cone, usually of copper and an outer body, typically of Monel (trade mark) and the electrical lead passes through the cone, up the cable and to the ship. The armour layer or outer cover comprises a plurality of wires and the termination is effected by the frictional force created by locating the wires between the cone and the outer body that lies outside the armour. The arrangement is that the individual wires are compressed between the inner cone and the outer body.

When the cover breaks its repair is relatively simple provided the repair can be carried out on land. However, when the break must be repaired at sea there have, in the past, been considerable problems. When the armour wires of the cover are defective then it is necessary to haul in the sonar equipment as it is possible that the equipment can be lost. If the ship's function is to detect submarines then its usefulness is reduced until the cable can be repaired.

A break in the armour cable can be difficult to predict. Breaks can occur after mere hours of use if, for example, the termination has been poorly made. Furthermore, retermination has recently become more important because steps are now taken to monitor the system and this has resulted in an ability to predict when retermination is required.

In order to reterminate a cable which has one or more broken armour strands, the termination must first be opened, and then moved up the cable past the break. The wires are carefully spaced and clamped and the termination is then remade.

The present invention provides an apparatus able first to break the termination in a damaged cable and, in a second aspect, provides an apparatus able to remake the termination.

Accordingly, in a first aspect, the present invention is an apparatus useful in the repair of the termination of an outer cover of an armoured cable where the outer cover comprises a plurality of wires and the termination is effected by location of the wires between an inner body within the outer cover and an outer body outside the outer cover, the apparatus comprising: a first block to surround the cable, the first block being adapted to grip the inner body; a second block to surround the cable with a first surface of the second block adjacent the first block, the second surface of the second block being able to abut an end of the outer body; means to force the first and second blocks apart to separate the inner and outer bodies and thus open the termination; and a wire separator adapted to retain the wires of the outer cover separate after the opening of the termination.

The second block is desirably adapted on a second surface to be gripped so that the second block can be forced to press the outer body over the inner body in retermination of the cable once the damaged wires have been cut off to remove the damaged portion.

The apparatus may also include a device to force the outer body over the wires and over the inner body to reterminate the cable without necessarily using the second block in the retermination step.

Aspects of the invention are illustrated, by way of example, in the accompanying drawings in which:

FIG. 1 is a general view illustrating a towing cable;

FIG. 2 is a partial view of a termination that may be separated according to the present invention;

FIG. 3 is a section through the apparatus according to the present invention in position on a cable;

FIG. 4 is an exploded view of part of the apparatus according to the present invention;

FIG. 5 illustrates retermination of a cable using the apparatus of FIG. 4;

FIG. 6 is an exploded view of a wire separator that forms part of the apparatus of the invention; and FIG. 7 illustrates further apparatus useful in the retermination.

FIG. 1 illustrates a cable 2 provided with stabilizing fairing 4 extending from a ship (not shown) beneath the ocean surface to tow a sonar device 6. The armoured portion of the cable extends from the ship to a casing 8 at the end of the cable 2. The termination starts immediately after the casing 8 and, as shown in FIG. 2, comprises an outer body 10 of generally cylindrical form and an inner body 12 having a generally conical form and formed with an end flange 13. An electrical lead 14 passes through the body 10, through the termination and an armoured cable 16 extends through the body 8 and finishes at the termination.

When a broken strand in the armour 16 is detected the sonar device 6 is hauled aboard ship and the apparatus according to the present invention is then used to break the termination.

As particularly shown in FIGS. 3 and 4 the apparatus comprises a first block 18 having a central opening 20 to surround the cable 2. The first block 18 is formed of two parts 22 and 24—see FIG. 4. The first part 22 has clear holes 26 through which bolts 28 extend. The second part 24 has threaded holes 30 to receive the bolts 28. The first part has clear openings 32 and the second part has locating studs 34 to extend into the clear openings 32. A block 18 may be positioned around a cable 2, by the bolts 28 being positioned through the clear holes 26 in first part 22 and tightened into the threaded holes 30.

The central opening 20 is provided with a circumferential channel 36 which, as shown particularly in FIG. 3, grips the flange 13 of the inner body 12.

A second block 38 is also formed in two parts 40 and 42. First part 40 has clear holes 44 through which bolts 46 extend to engage in threaded holes 48 in second part 42. The first and second parts are provided with threaded holes 50 in which bolts 52 engage.

The useful position of the apparatus is shown in FIGS. 3 and 4. A first surface 54 of the second block 38 is, in the useful position, adjacent an upper surface 56 of the first block 18. The upper or second surface 58 of the second block 38 is able to abut an end of the outer body 10 of the termination. As illustrated a central opening 60, through which the electrical cable 14 passes is provided with a shoulder 62 which acts as an abutment for the end of the outer body 10, the arrangement being shown in FIG. 3.

As particularly noted in FIG. 4 the second block 38 may be provided on its second surface with flanges 64 formed with holes 66. The arrangement permits the second block 18 to be used in the retermination of the cable and FIG. 6 illustrates that use. Second block 38 is reversed from its FIG. 3 position, that is it abuts the other end of outer body 10.

FIG. 5 illustrates a wire separator 68 adapted, by the provision of recesses 70 on its periphery, to retain the wires of the outer cover 16 after separation of the termination. The wire separator comprises two parts 72 and 74. There is a central opening 76. The two bodies 72 and 74 are retained together in the wire separator's useful position by bolts 77 extending through connecting plates 78 to engage in threaded recesses 80 in each part of the separator 68.

FIGS. 6 and 7 illustrate two methods for the retermination. The device of FIG. 7 comprises a first plate 82 at one end to abut the end of block 38 holding the outer body 10, shown in broken lines in FIG. 7. There are members 84 extending from the plate 82 to define a recess 86 to receive the component parts of the termination, including the wire separator 68 holding the wires 16. At the other end of the device there is a pin 88 exending through spaced limbs 90 formed at the ends of members 84. A turnbuckle 92 or hydraulic pulling device, for example that available under the trade mark ENERPAC, engages the pin 88 at one end; the other end can be attached to a deck of a ship. The turnbuckle 92 has the usual left and right hand threads at each end. Hydraulic pulling devices are more expensive, but easier to use.

It will be noted that FIGS. 6 and 7 illustrate essentially the same operation but with different means for applying the force to the outer body 12.

Using the apparatus according to the present invention the following procedure is carried out in first breaking and then remaking the termination of the outer cover of an armoured cable 2.

To use the apparatus according to the present invention first the cable is hauled into the ship, the sonar device is disconnected and sufficient of the fairing pieces 4 are removed to allow removal of the termination.

As shown in FIG. 3 first block 18 is attached to the conical inner body 12 by fitting the two parts 22 and 24 around the cable 2 with the flange 13 of the body 12 engaging in the channel 36. The bolts 52 in the second block 38 are loosened and the second block 38 then positioned around the cable. The bolts 28 positioned through the clear holes 44 and tightened into the threaded holes 48 to locate the second block 38 adjacent the first block 18 with the shoulder 62 of the second block 38 abutting the end of the outer body 10. The arrangement is as shown in FIG. 3.

The bolts 52 provide a means to force the first and second blocks apart. It will be noted that by tightening the bolts 52, that is by turning conventional right hand threaded bolts clockwise, the first and second bodies 18 and 38 will be forced apart as the bolts 52 push against the upper surface 56 of the first block 18. The inner body 12 is retained within the first block 18 and the outer body 10 moves with the second block 38 and is thus separated from the inner body 12. The separation is shown in broken lines in FIG. 3.

A torque wrench may be used to move the bolts 52. Pressure is applied by tightening bolts 52 in sequence keeping surfaces 54 and 56 generally parallel. If necessary heat, preferably by the application of a hot air blower, can be used to heat the outer body 18 to facilitate splitting of the joint.

The outer body 10 is moved up the cable about three feet and the wires 16 are unravelled about two feet past the break in the cable. The inner conical body 12 is pushed up the electrical lead towards the outer body 10.

The wire separator 68 is positioned over the cable and moved to the position shown in FIG. 6, that is to abut the flange 13 of the inner body 12. The wires 16 of the armoured cover were then equally spaced around the separator 68. With the armour casing made up of inner and outer wires the inner wires alternate with the outer wire. The wires are desirably taped in position within the recesses 70 at the periphery of the separator. As generally speaking there are more outer wires than inner wires, typically in the ratio of about 30 to 25, two outer wires may be placed side by side every ten wires. Clips such as at 95 in FIG. 6 may be used to prevent unneeded unravelling of the armour.

The joint may now be reterminated. First the second body 38 is split and removed from the cable. For both procedures shown in FIG. 6 and FIG. 7 the second body 38 is reversed on the cable that is, so the flanges 64 run alongside the outer body 10. The first body 18 is split and removed from the cable and plays no further part in the procedure.

As shown in FIG. 6 eyelets 96 are pinned to the holes 66 in the second body 38 and chains 98 may be attached to the eyelets 96. The chains 98 may incorporate chain pullers (not shown) or any other means of applying substantial force. The termination is remade by applying force to the chains 98 to pull the outer body 10 towards the wire separator as illustrated in FIG. 6. Typically the joint is partially remade, that is the outer body 10 is pulled about half way over the inner body 12, and a sealant, for example silicone, is liberally applied to each end of the outer body 10 and to the inner body 12. At this time the wires 16 may be trimmed to conform to the end of the inner body 12. Alternatively the joint may be completed by forcing the outer body 12 to its rest position, as illustrated in FIGS. 2 and 3. At this point the wires 16 may be trimmed. Trimming may be carried out by filing a notch in the armoured wires and bending the wires back and forth. The retermination has then been carried out.

In the apparatus shown in FIG. 7 the operation is precisely analogous. However, the force used is applied through plate 82 acting against the outer body 12. The turnbuckle 92 may be turned with a large wrench, as the means of applying the force, or a hydraulic pulling unit such as an Enerpac may be used. The device is moved along the cable thus acting to force the outer body 12 over the inner body 10 and over the wires 16 of the armour cable.

Using the apparatus of the present invention a cable may be reterminated in, at most, about two hours on a ship at sea where previously it was not considered desirable even to attempt to reterminate the cable at sea.

The embodiments of the invention in which an exclusive property or privilege is claimed are defined as follows:

1. Apparatus useful in repair of a termination of an outer cover of an armoured cable where the outer cover comprises a plurality of wires and the termination is effected by location of the wires between an inner body within the outer cover and an outer body outside the outer cover, the apparatus comprising:
   a first block to surround the cable and grip the inner body;
   a second block to surround the cable with a first surface of the second block adjacent the first block and a second surface of the second block abutting an end of the outer body;
   means to force the first and second blocks apart to separate the inner and outer bodies and thus open the termination; and
   a wire separator to retain the wires of the outer cover separate after the forcing open of the termination.

2. Apparatus as claimed in claim 1 in which the second block is gripped on its second surface whereby the second block can be forced to press the outer body over the inner body in retermination of the cable.

3. Apparatus as claimed in claim 1 in which, where the inner body has a peripheral flange at one end, projecting from the outer cover, the first block is provided with a channel to engage the peripheral flange.

4. Apparatus as claimed in claim 1 in which the means to force the first and second blocks apart comprises a plurality of threaded holes formed in the second body to receive bolts, tightening of the bolts acting to project the bolts from the first surface to force the second block from the first block.

5. Apparatus as claimed in claim 1 in which the second block has a central opening;
   a shoulder formed within the opening, the opening receiving the outer diameter of the outer body and the shoulder providing an abutment for the end of the outer body.

6. Apparatus as claimed in claim 1 in which the wire separator comprises a body with a central hole to surround the cable;
   recesses around the periphery of the body to accommodate the wires.

7. Apparatus as claimed in claim 6 in which the wire separator is formed in two halves, each half formed with a part of the central hole, and means to maintain the two parts together.

8. Apparatus as claimed in claim 1 further including a device to force the outer body over the wires and over the inner body to reterminate the cable.

9. Apparatus as claimed in claim 8 in which said device comprises a first plate at one end to abut an end of the outer body;
   members extending from the plate to define a recess to receive the component parts of the termination, including the wire separator holding the wires;
   means at the second end of the device to permit application of a force.

10. Apparatus as claimed in claim 9 in which the means at the second end of the device comprises a pin extending through spaced limbs;
    a turnbuckle to attach at one end to the pin and, at the other end, to a deck of a ship;
    whereby rotation of the turnbuckle moves the device to force the outer body over the inner body to reterminate the cable.

11. Apparatus as claimed in claim 9 in which the means at the second end of the device comprises a pin extending through spaced limbs;
    a hydraulic cylinder to attach at one end to the pin and, at the other end, to a deck of a ship;
    whereby operation of the hydraulic cylinder moves the device to force the outer body over the inner body to reterminate the cable.

* * * * *